Figure 1:
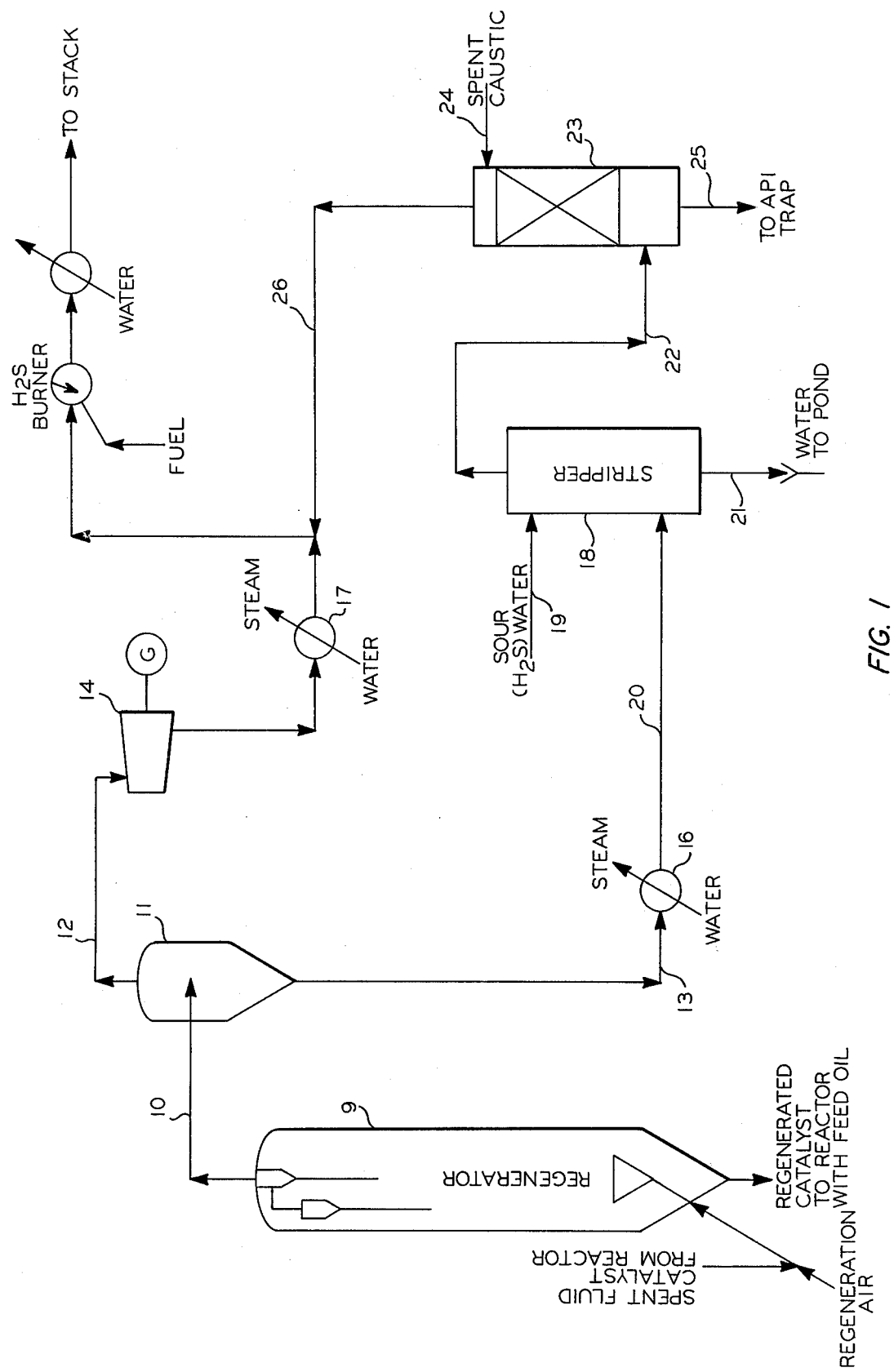

United States Patent [19]

Mitchell

[11] 4,208,384
[45] Jun. 17, 1980

[54] ENERGY RECOVERY, SOUR GAS STRIPPING AND CAUSTIC NEUTRALIZATION USING COMBUSTION GASES CONTAINING SOLIDS

[75] Inventor: Norris W. Mitchell, Sweeney, Tex.

[73] Assignee: Phillips Petroleum Company, Bartlesville, Okla.

[21] Appl. No.: 1,346

[22] Filed: Jan. 5, 1979

[51] Int. Cl.$^2$ .......................................... B01D 53/34
[52] U.S. Cl. .................................. 423/220; 423/232; 55/53; 210/59; 252/416
[58] Field of Search ...................... 423/210, 220, 215.5, 423/232, 421, 542; 252/416, 417; 55/52–54; 210/51, 59

[56] References Cited

U.S. PATENT DOCUMENTS

| | | | |
|---|---|---|---|
| 2,284,603 | 5/1942 | Belchetz et al. | |
| 2,302,209 | 11/1942 | Goddin, Jr. | |
| 2,355,016 | 8/1944 | Stein, Jr. | |
| 2,424,467 | 7/1947 | Johnson | |
| 2,881,129 | 4/1959 | Andrews et al. | 208/120 |
| 2,930,753 | 3/1960 | McMahon | 210/21 |
| 3,087,898 | 4/1963 | Pfeiffer et al. | 252/416 |
| 3,247,129 | 4/1966 | Roelofsen et al. | 252/417 |
| 3,551,102 | 12/1970 | Hettick et al. | 423/352 |
| 3,702,308 | 11/1972 | Bauer et al. | 252/417 |
| 4,009,121 | 2/1977 | Luckenbach | 252/417 |
| 4,081,508 | 3/1978 | Luckenbach | 423/210 |

*Primary Examiner*—Earl C. Thomas

[57] ABSTRACT

Combustion gases containing solids, e.g., gases resulting from regeneration of catalyst contact mass such as used in catalytic cracking of hydrocarbons or resulting from production of other materials or substances, e.g., carbon black, are passed to a separation zone, e.g., a cyclone separation zone in which separation of solids together with a substantial proportion of gases are separated resulting in a gas having a reduced solids content amounting to a tolerable maximum for utilization in an expansion zone, e.g., in a turbine to recover energy therefrom and then into a heat recovery unit or zone, e.g., to produce steam, and then pass to disposal, in one embodiment disposal including a combustion to convert trace amounts of hydrogen sulfide to sulfur dioxide; the solids and gas separated in the cyclone being used for heat recovery and then used as stripping medium to strip hydrogen sulfide from hydrogen sulfide containing fluid, e.g., water, to obtain as a bottoms for withdrawal to disposal substantially all of the solids and desoured water, an overhead containing in the gases hydrogen sulfide form the sour water and carbon dioxide, resulting from the combustion as in the regeneration of said catalyst contact mass, said gas being passed into contact with an alkaline medium, e.g., spent caustic to produce a substantially neutral or slightly alkaline readily disposable material and an overhead gas containing sulfur dioxide, carbon dioxide and hydrogen sulfide, in one embodiment a fuel or combustible material being added to the gas to convert therein $H_2S$ to $SO_2$, the latter being more tolerable, ecologically speaking.

5 Claims, 3 Drawing Figures

ENERGY RECOVERY, SOUR GAS STRIPPING AND CAUSTIC NEUTRALIZATION USING COMBUSTION GASES CONTAINING SOLIDS

This invention relates to the recovery of energy. It also relates to sour gas sripping. Further, it relates to recovery of solids from gases. Still further, it relates to the neutralization of solutions, e.g., a caustic or alkaline solution such as obtained from caustic treaters containing sodium carbonate and sodium bicarbonate.

In one of its concepts the invention provides a process for the recapture of energy, otherwise wasted, from a gas stream containing solids, e.g., a stream of combustion gases resulting from the regeneration of a catalyst contact mass, for example, a catalyst employed in the cracking of a hydrocarbon, by removing, in a solids removal zone, from said gases a sufficient proportion of their contained solids to result in a first stream of hot gases in which the residual contains solids, if any, is at a maximum tolerable in an expansion zone or engine, e.g., a turbine, passing the gases of reduced solids content through an energy conversion, producing and/or recovery zone and thence to disposal; withdrawing from said solids removal zone a second stream of gases containing all of the, or remainder of, said contained solids, in one embodiment recovering energy and/or heat therefrom; passing said second stream of gases which contains substantial quantities of carbon dioxide into a stripping zone, in said stripping zone stripping with said second stream hydrogen sulfide from sour water; then in a contacting zone contacting a third stream, thus produced, with an alkaline or spent caustic solution, fourth stream, to neutralize said fourth stream; withdrawing from said contacting zone a substantially neutralized, disposable stream having a pH not substantially above about 8; removing gases from said contacting zone, in one embodiment in a treating zone treating said gases, as in the presence of a suitable catalytic agent, contact mass or combustion catalyst, to convert therein hydrogen sulfide to sulfur dioxide, preferably in the presence of added oxygen and a combustible material supplying heat when combusted; passing the now thus obtained resulting gases to disposal, e.g., to a stack or to a flare, or to a boiler to recover heat therefrom—thus disposing of said resulting gases. In another of its concepts, the invention provides a process in which heat available in any stream in the process is employed at least in part to supply heat for the conversion of hydrogen sulfide to sulfur dioxide.

In a further concept of the invention, the stream from which solids have been removed to said tolerable maximum can be used, before or after expansion to recover energy therefrom to supply at least a portion of the heat for the conversion of hydrogen sulfide to sulfur dioxide said gases having a tolerable solids emission value.

Today, there is an ever-increasing need for conservation of energy. Also there is great need for improving the biosphere in which we all live. In any event, standards are constantly being established and even altered respecting legally tolerable emissions from plants. Yet, nevertheless, the public is demanding products of value to it and to the economy at large in terms of our social, economic and national defense posture.

Many processes or methods have been proposed to conserve energy and to comply with legal requirements as to emissions. Further, proposals have been made and employed for disposing of the various by-product streams which are produced.

It is an object of this invention to strip a sour water of its contained hydrogen sulfide with a gas to produce a water containing only a trace, if any, of hydrogen sulfide so that the water can be disposed of to the environment.

It is another object of the invention to recover energy. It is a further object of the invention to neutralize a used alkaline or caustic solution. It is a further object of the invention to recover energy from hot combustion gases containing solids, such as gases resulting from regeneration of a hydrocarbon cracking catalyst or in the production of carbon black, all the while processing said gases for ultimate disposal to the atmosphere.

Other aspects, concepts, objects and the several advantages of the invention are apparent from a study of this disclosure, the drawing and the appended claims.

According to the present invention, there is provided a process for the recapture of energy, otherwise wasted, from a gas stream containing solids which comprises in a solids removal zone removing from said gases a sufficient proportion of the contained solids to result in a first stream of hot gases in which the residual contained solids, if any, is at a maximum tolerable in an expansion zone, passing the gases of residual solids content through an energy conversion or recovery zone and thence to disposal; withdrawing from said solids removal zone a second stream of gases containing all of the, or remainder of, said contained solids; passing said second stream of gases which contains substantial quantities of carbon dioxide into a stripping zone, in said stripping zone stripping with said second stream hydrogen sulfide from sour water also introduced into said stripping zone; then in a contacting zone, contacting a third stream, thus produced, with an alkaline or spent caustic solution fourth stream to neutralize said fourth stream, withdrawing from said contacting zone a substantially neutralized, disposal stream; removing also from said contacting zone gases for discharge to the atmosphere.

Also according to the invention, the gases after being expanded in an expansion zone are contacted in a heat exchange zone to recover heat therefrom.

Still further according to the invention, water containing the solids contained in said second stream is discharged for disposal.

Further still according to the invention, the alkaline solution or caustic fourth stream treated in said contacting zone is neutralized to a pH below about 8 and in one embodiment is rendered substantially neutral following which it is discharged for disposal.

Further still according to the invention, the gases from the contacting zone are admixed with a combustible material preferably also with added oxygen and subjected to heat producing conditions to convert therein hydrogen sulfide to sulfur dioxide; as in the presence of a suitable agent, contact mass or combustion catalyst.

Referring now to the drawing flue gas 10 from a second stage cyclone in a fluid catalytic cracker regenerator 9, is passed to third stage cyclone 11 operated so that a minimum of about four volume percent of flue gas 10 will exit as underflow 13 of a cyclone 11, insuring substantially no solids (fluid catalytic cracking catalyst) are passed via 12 to expander 14 to generate power. The expanded gas is passed via steam boiler 17 to generate steam. The thusly expanded, cooled gases are passed to the smokestack.

Underflow 13, containing the solids which were present in 10, is passed to boiler 16 to generate steam: The cooled gases 20 are then utilized to strip sour ($H_2S$-containing) water 19 recovered from the refinery (e.g. crude stills).

Water 21 from stripper 18, now containing substantially no $H_2S$, but containing solids which were in stream 20, is passed to a settling pond, to settle the catalyst therefrom, and ultimately to decant the water to desired disposal.

Gas 22, from the stripper 18, enriched in $H_2S$ removed from the sour water, and, of course, containing $CO_2$ product of combustion from regenerator 9, is passed to spent caustic neutralizer 23. Spent caustic 24 (resulting from treating $CO_2$ from ethylene as produced by cracking ethane and/or propane in the presence of added steam, which when fresh, had a NaOH strength, weight percent, in the approximate range of 10 to 20, now comprising $NaHCO_3$, and $Na_2CO_3$, is added to neutralizer 23. In neutralizer 23, the $CO_2$ present in 22 is partially removed from the gas 22 by reaction with $Na_2CO_3$ in stream 24 to neutralize this stream to a pH of about 8 (no free $CO_3^=$, $OH^-$). The neutralized spent caustic 25, which can contain some "oil", is passed to a conventional refinery API (American Petroleum Institute) trap for final processing (oil skim and water—$NaHCO_3$ solution—recovery).

The gas 26 leaving neutralizer 23, now leaner in $CO_2$, is added to the stack.

One skilled in the art, in possession of this disclosure, having studied the same, will recognize an unusual or unobvious combination of benefits of the combination of functions, or themselves unobvious in concept of the combination. Thus, the invention utilizes: in addition to power or energy recovery from gas 12, which is substantially free of solids and will not damage the expander (the absence of solids being insured by effecting at least 4 volume percent of stream 10 exiting at 13), the recovery of the energy or waste heat to produce steam in 16 and 17, stripping of $H_2S$ from sour water 19 and, at the same time, importantly from an ecological viewpoint, removal of solids from gas 20, issuing $H_2S$-free water at 21, using $CO_2$ in gas 22 to lower the pH of spent caustic (comprising $NaHCO_3$ and $Na_2CO_3$) by reacting $Na_2CO_3$ to form additional $NaHCO_3$, a neutral or pH of about 8 water solution, finally charging a now decreased $CO_2$ content flue gas to the atmosphere.

| Calculated Example | |
|---|---|
| (10) Flue Gas, SCF/HR, (379 MMSCFD) | 15,792,000 SCFH |
| Temperature, °F., 1,400° F.(before quench); | 1200 (after quench) |
| Pressure, psig, | 32.9 psig |
| Composition, Vol %, Dry Basis | |
| CO, 0.055 | |
| $CO_2$, 16.1 | |
| $N_2$, 81.6 | |
| $O_2$, 2 | |
| $SO_x$, 0.045 | |
| $H_2S$, 0 | |
| Solids content (a), lbs/1000 SCF | 0.025 |
| | (400 #/hour) |
| (12) Overhead from third cyclone (11), SCF/HR, | 15,160,000 |
| Temperature, °F., | 1200 |
| Pressure, psig | 31.9 psig |
| Solids Content, lbs/1000 SCF, | nil |
| (13) Underflow, SCF/HR | 632,000 |
| Temperature, °F. | 1200 |
| Composition, Vol %, dry basis | |
| CO 0.055 | |
| $CO_2$ 16.1 | |
| $N_2$ 81.6 | |
| $O_2$ 2 | |
| $SO_x$ (a) 0.045 | |
| $H_2S$ 0 | |
| Solids Content, lbs/1000 SCF | 0.634 |
| | (400 #/hour) |
| Power Recovered in Expander (14), Btu/hr | $90 \times 10^6$ |
| | (90 MMBtu/hr) |
| Steam Produced in (14), lbs/hr | 672,000 |
| Temperature, °F. | 735 |
| Pressure, psig | 600 |
| Gas Temp. out, °F. | 450 |
| Steam Produced in (16), lbs/hr | 28,000 |
| Temperature, °F. | 735 |
| Pressure, psig | 600 |
| Gas Temp. out, °F. | 450 |
| Water Containing $H_2S$ (19), lbs/hr (100 gpm) | 50,600 |
| Temperature, °F. | 110 |
| $H_2S$, ppm | 1800 |
| Gas (20) to Stripper (18), SCF/HR | 632,000 |
| Temperature, °F. | 450 |
| Pressure, psig | 3.0 |
| Composition, vol. %, dry basis | |
| CO 0.055 | |
| $CO_2$ 16.1 | |
| $N_2$ 81.6 | |
| $O_2$ 2 | |
| $SO_x$ 0.045 | |
| $H_2S$ 0 | |
| Solids Content, lbs/1000 SCF | 0.634 |
| | (400 #/hour) |
| Water-Solids to Pond via (21), lbs/hr | 51,000 |
| Temperature, °F. | 175 |
| Solids, Content, lbs/1000 lbs | 7.843 |
| | (400 #/hour) |
| $H_2S$, ppm | nil |
| Gas Via (22) to Neutralizer (23), SCF/HR | 633,000 |
| Temperature, °F. | 175 |
| Pressure, psig | 2.5 |
| Composition, vol %, dry basis | |
| CO .055 | |
| $CO_2$ 16.1 | |
| $H_2$ 81.5 | |
| $O_2$ 2 | |
| $SO_x$ 0.044 | |
| $H_2S$ 0.157 | |
| Solids Content, lbs/1000 SCF | nil |
| Spent Caustic (from Ethylene Treatment) (24), LBS/HR | 10,500 |
| pH | 12 |
| Composition, wt. % (b) | |
| $NaHCO_3$ 0 | |
| $Na_2CO_3$ 3.0 | |
| NaOH 2.5 | |
| Gas Yield (26), SCF/HR | 630,500 |
| Temperature, °F. | 125 |
| Pressure, psig | 2.0 |
| Composition, Vol %, dry basis | |
| CO 0.068 | |
| $CO_2$ 13.0 | |
| $N_2$ 84.3 | |
| $O_2$ 2.59 | |
| $SO_x$ * | |
| $H_2S$ trace (c) | |

-continued

Calculated Example

| | |
|---|---|
| Solids Content, lbs/1000 SCF | nil |
| To API Trap Via (25), LBS/HR | 10,980 |
| pH, | About 8 |
| Composition, wt. % | |
| NaHCO$_3$ | 9.2 |
| Na$_2$CO$_3$ | 0.2 |

Ranges of Operating Conditions:

| Regenerator (9): | Ranges | Specific |
|---|---|---|
| Temperature, °F. | 1250 to 1450 | 1375 |
| Pressure, psig | 31 to 35 | 33 |
| Stripper (18): | | |
| Temperature, °F. | 150 to 200 | 175 |
| Pressure, psig | 2 to 4 | 3 |
| Neutralizer (23): | | |
| Temperature, °F. | 100 to 150 | 125 |
| Pressure, psig | 2 to 3.5 | 2.5 |
| Ratio of Water (19)/Gas (20): | | |
| LBS/1000 SCF | 70 to 90 | 79 |
| Ratio of "Caustic" (24)/Gas (22): | | |
| LBS/1000 SCF | 15 to 20 | 16.5 |
| Gas (20): | | |
| Temperature, °F. | 400 to 500 | 450 |
| Pressure, psig | 2 to 4 | 3 |
| Gas (22): | | |
| Temperature, °F. | 150 to 200 | 175 |
| Pressure, psig | 2 to 4 | 3 |

(a) SO$_x$ is SO$_2$, SO$_3$.
(b) Original NaOH solution about 4.75 wt. % NaOH.
(c) Can be greater than 10 ppm H$_2$S by volume.
*Can be above 10 ppm The conversion of hydrogen sulfide to sulfur dioxide is particularly advantageous, especially when employing heat already extant in the process, because there can be tolerated in the emission 250 parts per million by volume of sulfur dioxide whereas only 10 parts per million by volume of hydrogen sulfide is permitted.

Viewing the data in the above example, it is noteworthy to recall that at a pH below 8.3 hydroxyl ion does not exist.

Further, in the presence of carbon dioxide which in the example is about 100 times that of the hydrogen sulfide no appreciable hydrogen sulfide will react in the alkaline or caustic solution and therefor virtually no hydrogen sulfide will be present in stream (25) removed to the trap.

Although the invention has been described respecting its application to hot combustion gases resulting from the regeneration of a hydrocarbon cracking catalyst, it will be obvious to those skilled in the art in possession of this disclosure, having studied the same, that the invention is equally applicable to other hot combustion gases containing solids, e.g., combustion gases resulting from the manufacture of carbon black as in the furnace carbon black operation.

Further, although the operation illustrated is a fluidized operation wherein the catalyst being regenerated is a fluidized cracking catalyst, it will be obvious to those skilled in the art having studied this disclosure that the invention is equally applicable to other catalyst or contact regeneration or treatment. Thus, hot gases resulting from fixed or moving bed operations such as catalytic operations or other chemical reaction operations and containing some solids can be processed according to the invention in at least one of its forms or embodiments, as herein described.

Reasonable variation and modification are possible within the scope of the foregoing disclosure, drawing, and the appended claims of the invention the essence of which is that, as described, a hot combustion gas containing solids is treated to remove from a portion thereof solids down to a tolerable maximum whereupon the thus treated portion of the stream is used to recover heat or energy therefrom; another stream thus obtained containing the solids in substantially increased concentration; optionally after removal of heat therefrom, is employed to strip hydrogen sulfide from sour water, thus preparing the water for disposal, the water containing said solids, resulting in a gas stream rich in carbon dioxide and containing hydrogen sulfide, utilizing said stream, in view of its carbon dioxide content, to neutralize an alkaline stream, resulting in a substantially neutralized stream which can be disposed of and a gas stream which can be emitted but which in a now preferred embodiment is subjected to conditions converting hydrogen sulfide to sulfur dioxide.

I claim:

1. A process for the recapture of energy from a hot combustion gas stream containing solids and carbon dioxide which comprises in a solids removal zone removing from said gases sufficient of said solids to result in a first stream of hot gases in which the residual contained solids, if any, will be at a maximum tolerable in an expansion zone, passing the gases of residual solids content through an expansion zone to accomplish an evergy conversion and/or recovery and thence to disposal; withdrawing from said solids removal zone a second stream of gases containing all of the, or remainder of, said contained solids, said second stream of gases containing substantial quantities of carbon dioxide, and passing said second stream into a stripping zone, in said stripping zone stripping with said second stream hydrogen sulfide from sour water, then in the contacting zone a third stream thus produced in said stripping zone is contacted with an alkaline solution to neutralize said solution, withdrawing from said contacting zone a substantially neutralized, disposable, solution, recovering gases from said contacting zone and disposing of said gases to the atmosphere.

2. A process according to claim 1 wherein the expansion zone comprises a turbine and the solids content of the gases does not exceed about 96% maximum.

3. A process according to claim 1 wherein the gases which have been expanded in said expansion zone are utilized for heating purposes to recover further energy or heating value therefrom.

4. A process according to claim 1 wherein at least one stream of the gases resulting from said expansion zone and from said contacting zone are subjected to conditions suited to convert hydrogen sulfide therein to sulfur dioxide.

5. A process according to claim 1 wherein at least one of the streams resulting from said expansion zone and from said contacting zone is ultimately utilized for producing heat as in a steam boiler.

* * * * *